United States Patent
Muggulla et al.

(10) Patent No.: US 11,885,452 B2
(45) Date of Patent: Jan. 30, 2024

(54) TESTABLE TERMINATION FITTING

(71) Applicant: Franklin Fueling Systems, LLC, Madison, WI (US)

(72) Inventors: Kiran Muggulla, Madison, WI (US); James Novak, Evansville, WI (US); Todd Breuer, McFarland, WI (US); Justin F. Kuehn, Sun Prairie, WI (US); Randall Boucher, Saco, ME (US)

(73) Assignee: Franklin Fueling Systems, LLC, Madison, WI (US)

( * ) Notice: Subject to any disclaimer, the term of this patent is extended or adjusted under 35 U.S.C. 154(b) by 0 days.

(21) Appl. No.: 17/494,756

(22) Filed: Oct. 5, 2021

(65) Prior Publication Data

US 2023/0105113 A1   Apr. 6, 2023

(51) Int. Cl.
| | |
|---|---|
| *F16L 39/00* | (2006.01) |
| *F16L 33/23* | (2006.01) |
| *F16L 9/18* | (2006.01) |
| *F16L 21/02* | (2006.01) |
| *F16J 15/06* | (2006.01) |

(52) U.S. Cl.
CPC .............. *F16L 39/005* (2013.01); *F16L 9/18* (2013.01); *F16L 33/23* (2013.01); *F16J 15/06* (2013.01); *F16L 21/02* (2013.01)

(58) Field of Classification Search
CPC ......... F16L 33/23; F16L 39/005; F16L 39/02; F16L 33/01
USPC .......................................... 285/123.1–123.17
See application file for complete search history.

(56) References Cited

U.S. PATENT DOCUMENTS

| | | | | |
|---|---|---|---|---|
| 4,139,224 A | * | 2/1979 | Leach | F16L 33/23 |
| 5,401,064 A | * | 3/1995 | Guest | F16L 37/0925 |
| | | | | 285/123.1 |
| 10,781,948 B1 | * | 9/2020 | Gregory | F16L 21/065 |
| 2011/0025048 A1 | * | 2/2011 | Webster | F16L 33/23 |
| 2017/0102102 A1 | * | 4/2017 | Goble | F16L 33/222 |

FOREIGN PATENT DOCUMENTS

| | | | | |
|---|---|---|---|---|
| EP | 0222051 A1 | * | 1/1986 | F16L 33/22 |
| WO | WO-2011155436 A1 | * | 12/2011 | F16L 25/0036 |
| WO | WO-2015156198 A1 | * | 10/2015 | F16L 33/23 |

* cited by examiner

*Primary Examiner* — Zachary T Dragicevich
(74) *Attorney, Agent, or Firm* — Faegre Drinker Biddle & Reath LLP (57) ABSTRACT

A termination fitting assembly for use with a conduit includes the conduit comprising a primary pipe positioned centrally within a secondary pipe along a longitudinal axis of the conduit and the conduit having an interstitial space defined between the primary pipe and secondary pipe. The termination fitting assembly includes an interior fitting having an inner wall and an outer wall, the inner wall sized and shaped for insertion into and sealing with the primary pipe, and the outer wall extending circumferentially around the secondary pipe of the conduit. The termination fitting assembly includes an annular channel defined between the inner wall and the outer wall of the interior fitting and in fluid communication with the interstitial space of the conduit and an exterior fitting positioned around the conduit.

20 Claims, 7 Drawing Sheets

Fig. 5C

TESTABLE TERMINATION FITTING

FIELD OF THE DISCLOSURE

The present disclosure relates to a testable termination fitting and methods for use thereof and, more particularly, to a testable termination fitting coupled with a double-walled conduit and methods for use thereof.

BACKGROUND OF THE DISCLOSURE

In the field of conveying hydrocarbon products, for example gasoline, kerosene, biofuels, and various other fluids and/or gases, double-walled piping or conduits may be used for containing the product. Double-walled conduits are composed of a primary pipe positioned within a secondary pipe, thus defining an interstitial space between the primary pipe and the secondary pipe of the double-walled conduit. This may provide additional protection against leakage of the hydrocarbon products since products that leak from the primary pipe can be retained by the secondary pipe. Protection against leakage may be desired when conveying hydrocarbon products since leaking of these products may cause detrimental contamination of the surrounding environment. Monitoring of the interstitial space of the double-walled pipe may be beneficial to ensure that the double-walled conduits are properly containing the product being conveyed and facilitate early intervention in the case of malfunction.

SUMMARY OF THE DISCLOSURE

The disclosure, in one example thereof, provides a termination fitting assembly for use with a conduit, the conduit comprising a primary pipe positioned centrally within a secondary pipe along a longitudinal axis of the conduit, the conduit having an interstitial space defined between the primary pipe and secondary pipe. The termination fitting assembly includes an interior fitting having an inner wall and an outer wall, the inner wall sized and shaped for insertion into and sealing with the primary pipe, and the outer wall extending circumferentially around the secondary pipe of the conduit. The termination fitting further includes an annular channel defined between the inner wall and the outer wall of the interior fitting and in fluid communication with the interstitial space of the conduit and an exterior fitting positioned around the conduit.

In one form thereof, the termination fitting assembly further includes a compression ring and an annular seal positioned about the secondary pipe.

In another form thereof, the exterior fitting includes at least two exterior fitting portions configured for reversable coupling about the conduit.

In another form thereof, the exterior fitting exerts a compressive force onto the annular seal when the two exterior fitting portions are securely coupled.

In another form thereof, when the compressive force is exerted onto the annular seal, the annular seal is sealingly engaged with the conduit and the interior fitting.

In another form thereof, the annular channel extends circumferentially and continuously around the conduit.

In another form thereof, the primary pipe includes an inner diameter and the secondary pipe includes an outer diameter, and wherein the outer wall of the interior fitting is spaced from the inner wall of the interior fitting by a distance that is larger than a distance between an inner diameter of the primary pipe and an outer diameter of the secondary pipe.

In another form thereof, the annular seal is compressed against the outer wall of the interior fitting at a junction and the annular channel terminates at the junction.

The disclosure, in another example thereof, provides a termination fitting assembly for use with a conduit, the conduit defined by a primary pipe positioned within a secondary pipe and the conduit having an interstitial space defined between the primary pipe and secondary pipe, the primary pipe having an inner diameter and the secondary pipe having an outer diameter. The termination fitting assembly includes an interior fitting positioned at least partially within the primary pipe, the interior fitting having an inner wall and an outer wall defining a gap between the inner wall and the outer wall and an exterior fitting extending about the secondary pipe. The termination fitting further includes wherein a distance between the inner diameter of the primary pipe and the outer diameter of the secondary pipe is less than a distance between the inner wall and the outer wall.

In one form thereof, the interior fitting is an integral and continuous element such that the channel between the inner wall and the outer wall is a continuous and annular.

In another form thereof, the channel between the inner wall and the outer wall of the interior fitting is in fluid communication with the interstitial space of the conduit.

In another form thereof, the termination fitting assembly further includes an annular seal and a compression ring, the annular seal sealingly engageable with the conduit and the interior fitting.

In another form thereof, the exterior fitting is composed of two exterior fitting portions that are reversibly coupled and clamped around the conduit.

In another form thereof, when the exterior fitting is clamped circumferentially around the conduit, the first and second exterior portions exert a compressive force onto the annular seal.

In another form thereof, the compressive force activates the annular seal, such that the annular seal is sealingly engaged with the conduit and the interior fitting.

The disclosure, in another example thereof, provides a method of testing an interstitial space of a double-walled conduit, the interstitial space defined as the space between a primary pipe and a secondary pipe of the double-walled conduit, the double-walled conduit defining a longitudinal passageway. The method includes positioning a compression ring circumferentially around the double-walled conduit and positioning a seal circumferentially around the double-walled conduit and directly adjacent the compression ring. The method further includes inserting an interior fitting at least partially into the longitudinal passageway of the double-walled conduit and securing an exterior fitting circumferentially around double-walled conduit, such that a portion of exterior fitting engages with at least a portion of the interior fitting and the compression ring such that the seal creates sealed engagement between the interior fitting and the conduit.

In one form thereof, an annular channel extends between an inner wall and an outer wall of the interior fitting.

In another form thereof, securing the exterior fitting circumferentially causes compression of the compression ring and activates the seal to be sealingly engaged with the interior fitting and the double-walled conduit.

In another form thereof, the annular channel is positioned for fluid communication with the interstitial space.

In another form thereof, the exterior fitting is composed of a first and second exterior fitting, and securing the exterior fitting includes positioning the first exterior fitting on a first side of the double-walled conduit, positioning the second exterior fitting on a second side of the double-walled conduit, engaging the first and second exterior fitting portions through compressing the portions against the double-walled conduit until openings of the first and second exterior fitting portions abut one another, and securing the first and second exterior portions together with at least one bolt.

In another form thereof, the method further includes monitoring the annular channel for detecting fluid, gas, and pressure levels in the interstitial space.

The above-mentioned and other features of the invention and the manner of obtaining them will become more apparent and the invention itself will be better understood by reference to the following description of an exemplary embodiment of the invention taken in conjunction with the accompanying drawings.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. Although the drawings represent an embodiment of various features and components according to the present disclosure, the drawings are not necessarily to scale and certain features may be exaggerated in order to better illustrate and explain the present disclosure. The exemplification set out herein illustrates an embodiment of the invention, and such exemplification is not to be construed as limiting the scope of the invention in any manner.

DETAILED DESCRIPTION OF THE DRAWINGS

For the purposes of promoting an understanding of the principals of the invention, reference will now be made to the embodiment illustrated in the drawings, which is described below. The embodiment disclosed below is not intended to be exhaustive or limit the invention to the precise form disclosed in the following detailed description. Rather, the embodiment is chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 1:
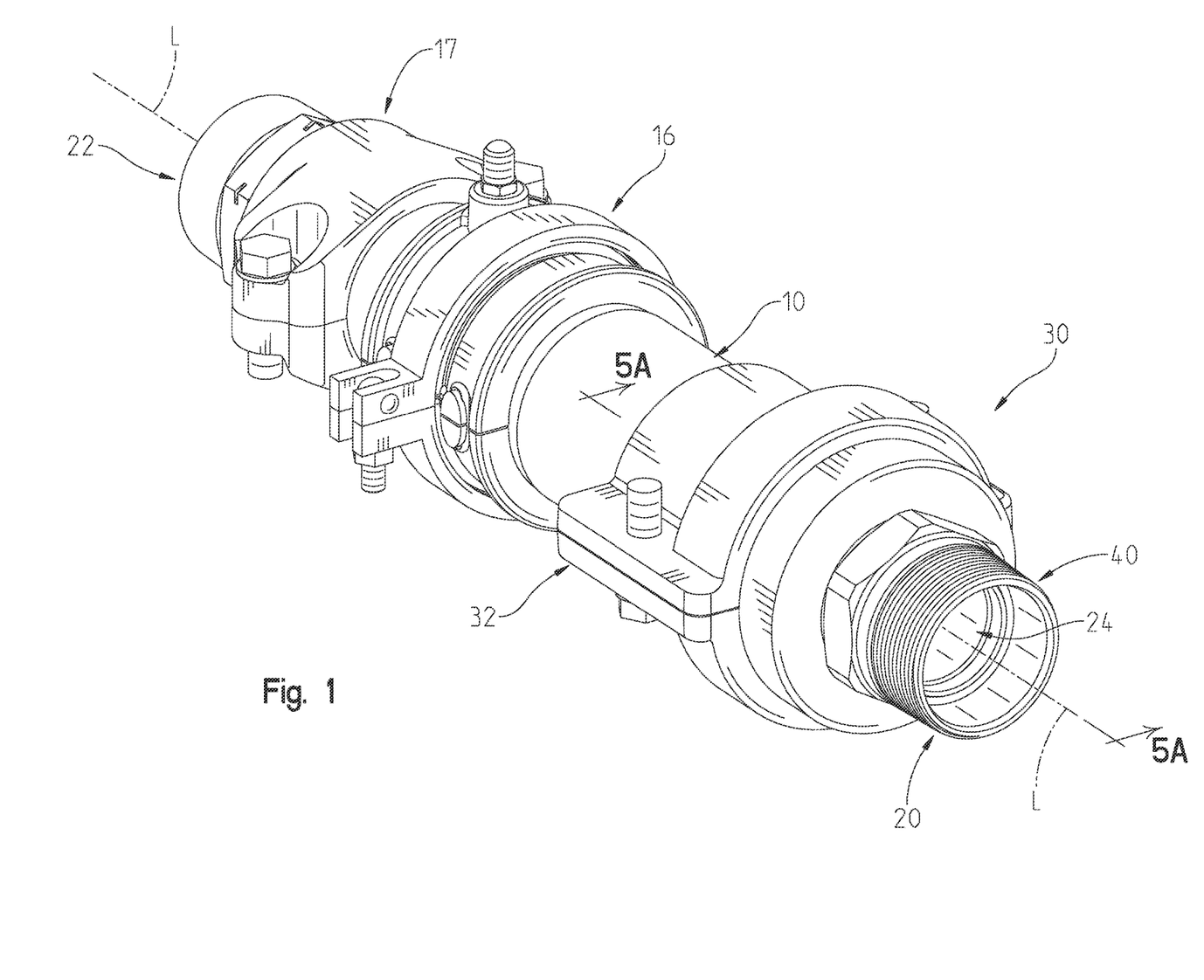
FIG. 1 is a top perspective view of a termination fitting assembly and a conduit.
Figure 2:
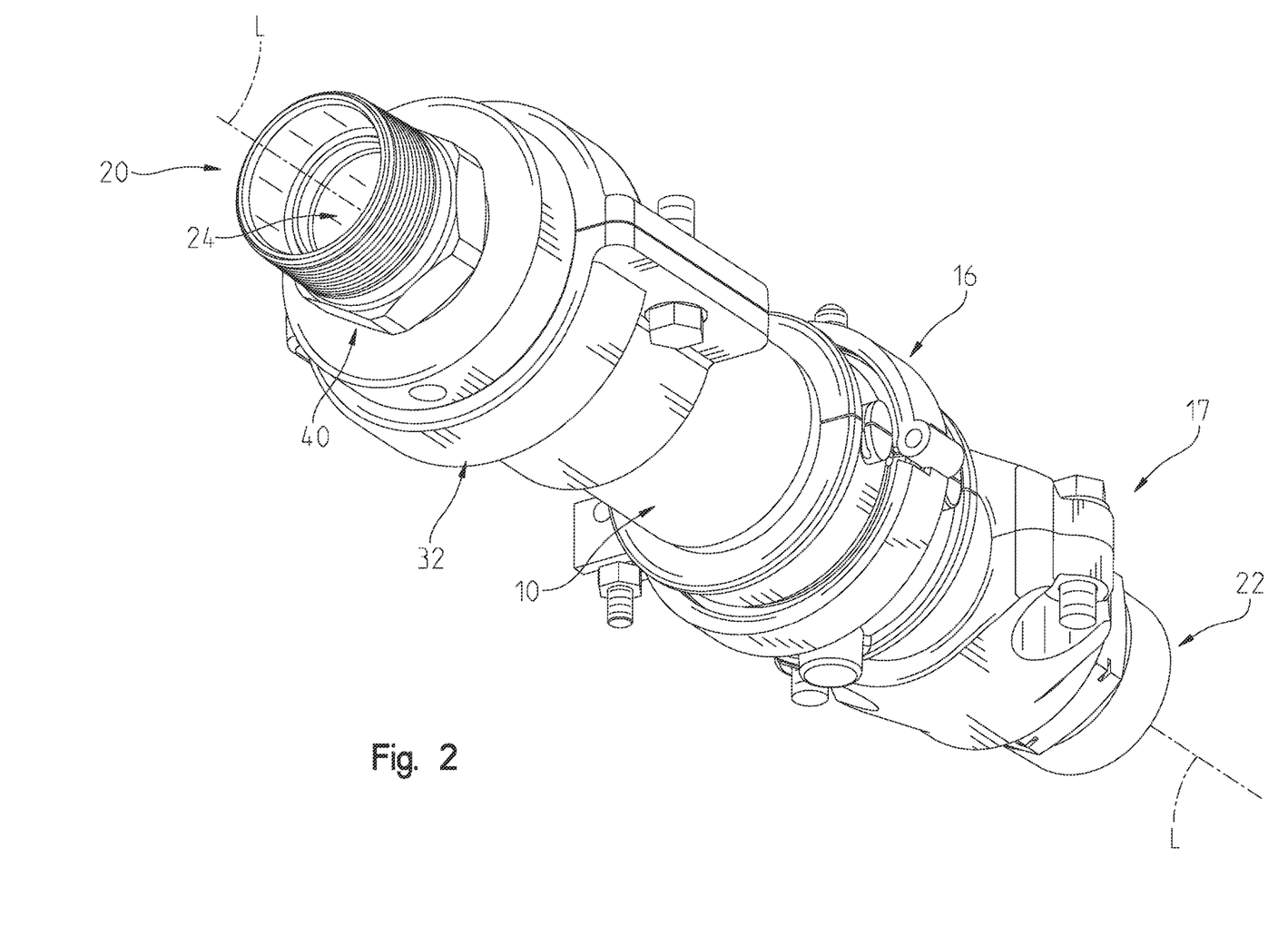
FIG. 2 is a bottom perspective view of the termination fitting assembly and the conduit of FIG. 1.

FIGS. 1 and 2 illustrate perspective views of a conduit, illustratively double-walled conduit 10, with coupling assemblies 16, 17 and termination fitting assembly 30 positioned around double-walled conduit 10. Double-walled conduit 10 may be configured for holding and transporting a variety of fluids such as gasoline, diesel, kerosene, or the like. Double-walled conduit 10 comprises inner, primary pipe 14 (FIG. 3) centrally located within outer, secondary pipe 15 (FIG. 3) and interstitial space 18 (FIG. 3) defined as the space between primary pipe 14 and secondary pipe 15. Double-walled conduit 10 extends along longitudinal axis L between proximal end 20 and distal end 22 of double-walled conduit 10 and defines longitudinal passageway 24. As illustrated in FIGS. 1 and 2, positioned around double-walled conduit 10 is termination fitting assembly 30 at proximal end 20 of double-walled conduit 10 and coupling assemblies 16, 17 at distal end 22 of double-walled conduit 10. Termination fitting assembly 30 comprises exterior fitting portion 32 and interior fitting portion 40, as will be described further herein. Coupling assembly 16, for example, may be a split test boot for sealing double-walled conduit 10 at a point of termination of secondary pipe 15 and for monitoring for any leaks. For example, coupling assemblies 16, 17 may be a split test boot made in accordance with U.S. Pat. No. 9,958,096 titled "Split Test Boot," issued on May 1, 2008, the entire disclosure of which is hereby explicitly incorporated herein by reference. Coupling assemblies 16, 17 may be any other suitable attachment, sealing, or testing assembly for use along a double-walled conduit. In various embodiments, double-walled conduit 10 does not comprise coupling assemblies 16, 17. For example, termination fitting assembly 30 described herein accomplishes the same functional purpose as coupling assemblies 16, 17 when coupling assemblies 16, 17 are embodied as the split test boot. As such, in various embodiments, double-walled conduit 10 comprises an additional termination fitting assembly 30 at distal end 22 of double-walled conduit 10 rather than coupling assemblies 16, 17. In these embodiments, double-walled conduit 10 comprises at least two termination fitting assemblies 30, one positioned at each of distal end 22 and proximal end 20 of double-walled conduit 10.

Figure 3:
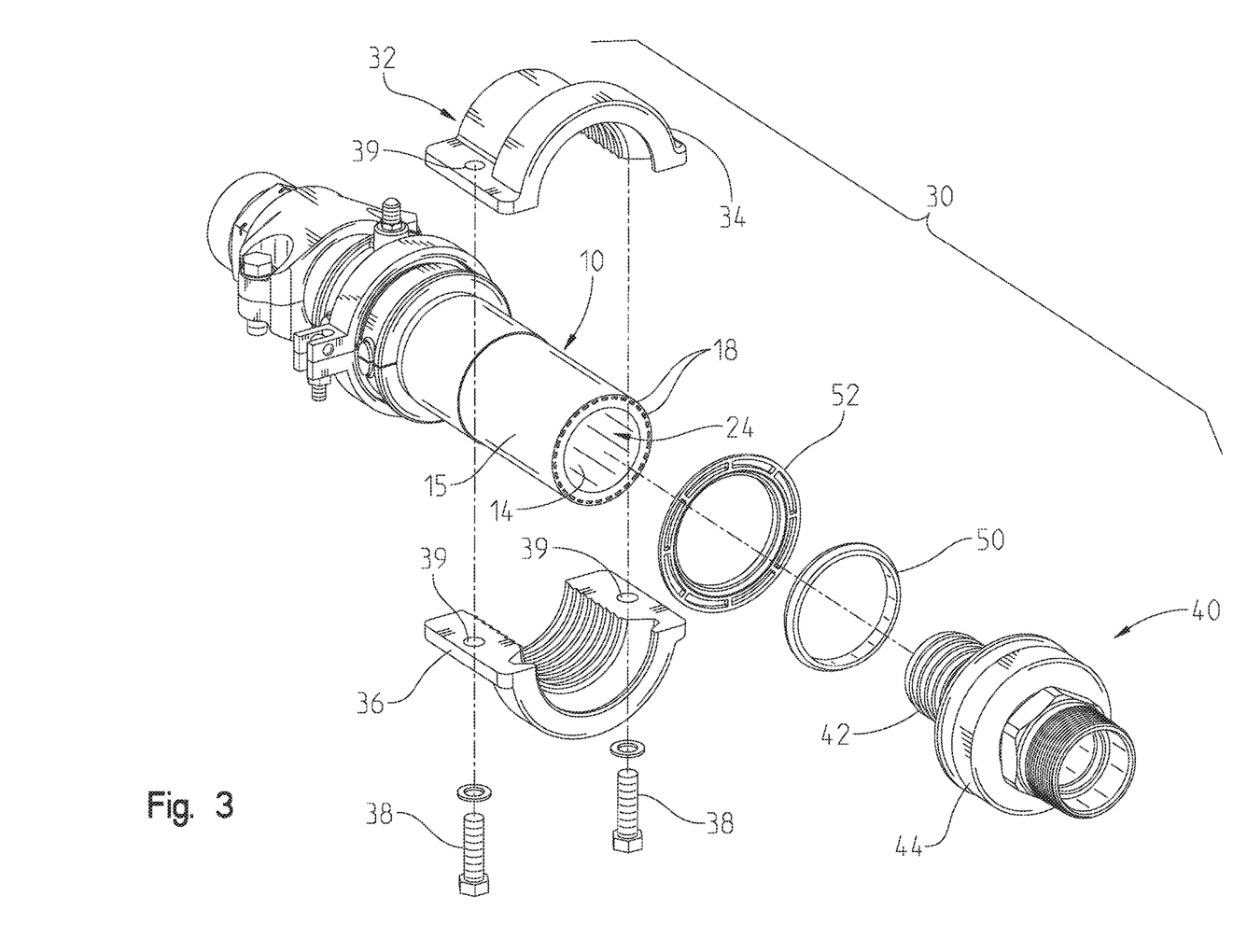
FIG. 3 is an exploded view of the termination fitting assembly of FIG. 1.

With reference to the exploded view illustrated in FIG. 3, termination fitting assembly 30 comprises exterior fitting 32 having first exterior fitting portion 34 and second exterior fitting portion 36 wherein first and second exterior fitting portions 34, 36 are reversibly coupled, i.e., they are able to be coupled and decoupled repeatably. Each exterior fitting portion 34, 36 has at least two openings 39 configured for receiving at least two coupling fasteners, e.g., bolts 38. The at least two openings 39 of each exterior fitting portion 34, 36 are configured for alignment for receiving at least two coupling bolts 38 to operatively couple first exterior fitting portion 34 and second exterior fitting portion 36. In other words, a first opening of the at least two openings 39 of first exterior fitting portion 34 is configured to align with a first opening of the at least two openings 39 of second exterior fitting portion 36 such that one of the bolts 38 may be inserted through each first opening of the openings 39. The above description also applies to a second opening of at least two openings 39 of first exterior fitting portion 34 and a second opening of at least two openings 39 of second exterior fitting portion 36 in combination with a second bolt of bolts 38. In various embodiments, coupling bolts 38 may be interchanged with any other suitable coupling mechanism. As such, first and second exterior fitting portions 34, 36 are configured for being operatively coupled and secured to one another and circumferentially positioned around double-walled conduit 10, as will be described further herein with reference to FIGS. 5A-5C.

Further, as illustrated in FIG. 3, termination fitting assembly 30 comprises interior fitting 40. Interior fitting 40 may comprise barbed portion 42 for being received within longitudinal passageway 24 of double-walled conduit 10. More particularly, barbed portion 42 is sized to be inserted into the inner diameter of primary pipe 14 and to sealingly interlock therewith. Interior fitting 40 additionally comprises outer portion 44 configured for mating with seal 50 and exterior fitting 32 at a position outside of double-walled conduit 10. Interior fitting 40 is an integral, monolithic piece that extends continuously and circumferentially through 360 degrees, such that interior fitting 40 is a one piece annular element. As illustrated, termination fitting assembly 30 additionally comprises compression ring 52 configured for mating with seal 50 in operation. Compression ring 52 may, in an alternative embodiment, comprise various recesses or gaps within compression ring 52 to allow for the partial collapse of compression ring 52 when a compressive force is exerted onto it. Although, in the embodiments described herein, compression ring 52 does not partially collapse but rather is compressed axially by exterior fitting 32, as will be described further herein with reference to FIGS. 5A-5C. Seal 50 may be an O-ring and composed of an elastomer such as PTFE, Nitrile, Neoprene or any other suitable elastomer. In various embodiments, seal 50 may be any other suitable annular sealing mechanism.

Figure 4:
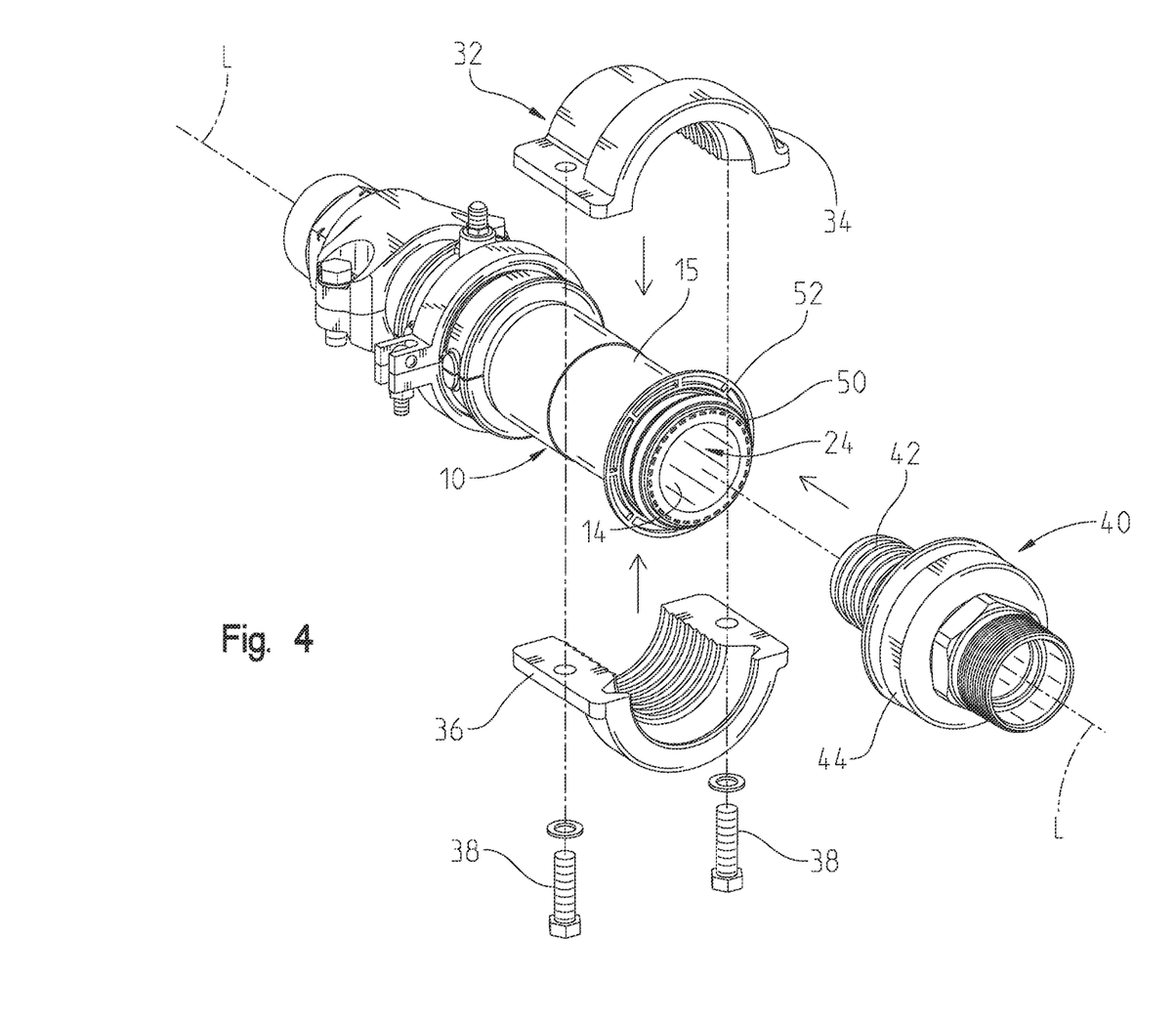
FIG. 4 illustrates a step of the assembly of the termination fitting assembly of FIG. 1, and FIGS. 5A, 5B, and 5C are cross-section views of the termination fitting of FIG. 1 sequentially illustrating assembly thereof.

FIG. 4 illustrates double-walled conduit 10 and termination fitting assembly 30 during assembly of termination fitting assembly 30 onto double-walled conduit 10. While FIG. 4 (and FIGS. 3 and 5A-5C) illustrates secondary pipe 15 having a step in the thickness such that the thickness of secondary pipe 15 varies, in other embodiments, secondary pipe 15 has a constant thickness. In some embodiments, the step in the thickness of secondary pipe 15 illustrated in FIGS. 3-5C is meant to convey a scuff guard positioned around secondary pipe 15, as is known in the art. As illustrated in FIG. 4, compression ring 52 has been positioned onto double-walled conduit 10, and specifically over an outer diameter of secondary pipe 15, such that double-walled conduit 10 is positioned centrally within compression ring 52. Adjacent compression ring 52 is seal 50, which is illustrated positioned over double-walled conduit 10, and specifically positioned over the outer diameter of secondary pipe 15, such that seal 50 forms an annular sealing around double-walled conduit 10. In various embodiments, after positioning of compression ring 52 and seal 50, interior fitting 40 is inserted into double-walled conduit 10 in the direction of arrow A which extends generally along (i.e., parallel to or coincidental with) longitudinal axis L. Specifically, interior fitting 40 is inserted into primary pipe 14 such that at least a portion of interior fitting 40, illustratively barbed portion 42, is inserted into longitudinal passageway 24, while at least a portion of interior fitting 40, illustratively outer portion 44, is positioned circumferentially outside of secondary pipe 15 of double-walled conduit 10. When barbed portion 42 is inserted into longitudinal passageway 24, the barbs of barbed portion 42 engage with the inner walls of primary pipe 14 causing full engagement between barbed portion 42 and primary pipe 14. Alternatively, in some embodiments, barbed portion 42 is inserted into longitudinal passageway 24 without causing immediate engagement between the barbs and the inner surface of primary pipe 14. Rather, primary pipe 14 and secondary pipe 15 may be structured such that coupling of exterior fitting 32 onto secondary pipe 15 and subsequent compression of primary pipe 14 and secondary pipe 15 causes engagement between the barbs of barbed portion 42 and the inner surface of primary pipe 14. In this way, axial movement of interior fitting 40 opposite to the direction of insertion relative to primary pipe 14 is resisted by the engagement between the barbs and the inner wall of primary pipe 14. Engagement of the barbs and the inner wall of primary pipe 14 also functions to fluidly seal interior fitting 40 to primary pipe 14 and prevent fluid flow therebetween. Once interior fitting 40 is fully inserted into (primary pipe 14) and onto (secondary pipe 15) double-walled conduit 10, exterior fitting 32 is secured around double-walled conduit 10 circumferentially. In some embodiments, fully inserted is defined as proximal end 20 (FIG. 1) of double-walled conduit 10 abutting termination fitting assembly 30 and full engagement between barbed portion 42 of interior fitting 40 and primary pipe 14. Placement and securement of exterior fitting 32 will be described further herein with reference to FIGS. 5A-5C.

Figure 5A:
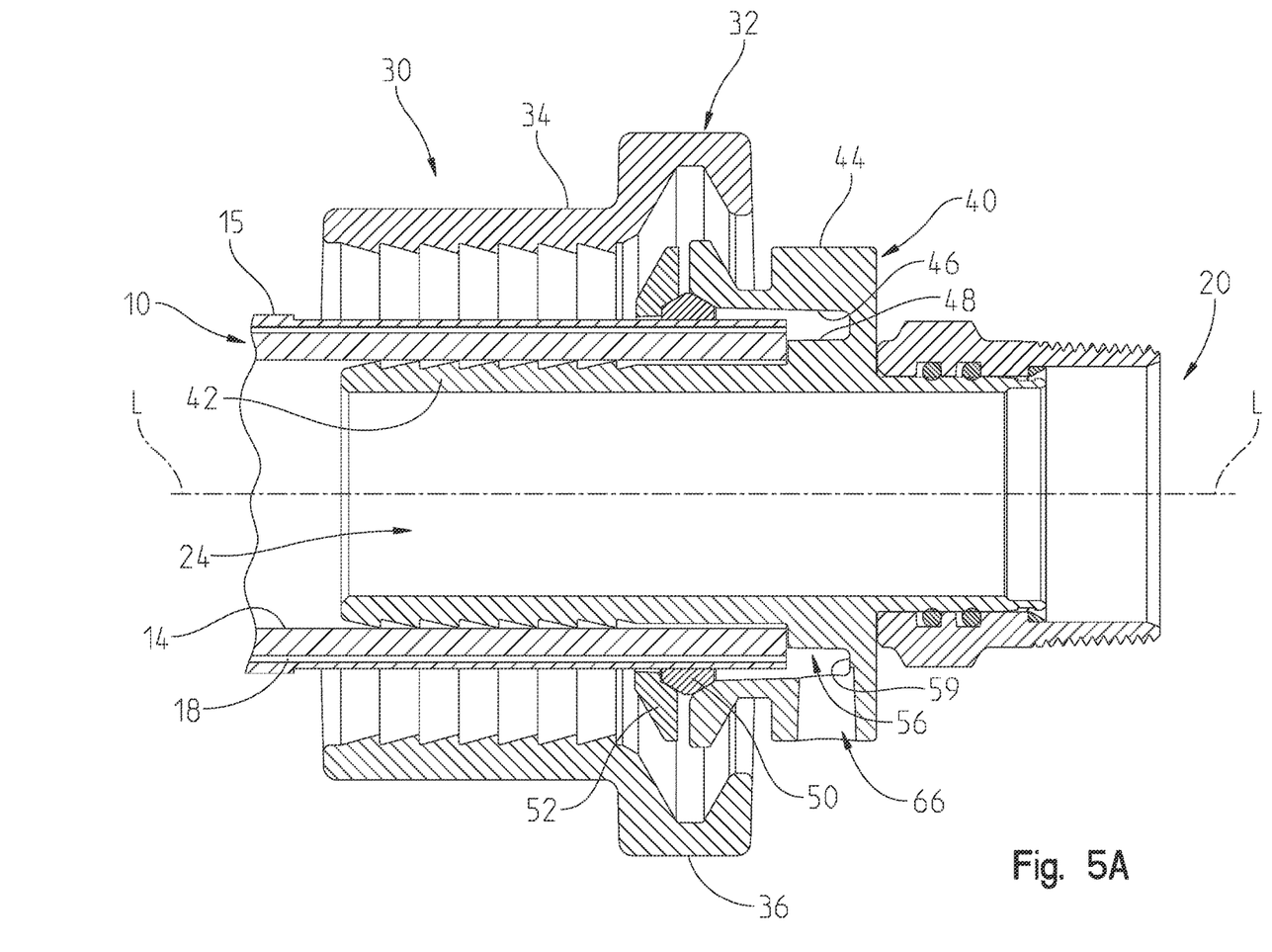

FIG. 5A is a longitudinal cross-section illustrating double-walled conduit 10 with interior fitting 40 positioned partially within longitudinal passageway 24. As previously described, barbed portion 42 is positioned within longitudinal passageway 24 and causes sealed engagement between the barbed portion 42 and primary pipe 14 upon insertion of interior fitting 40 into conduit 10 through the barbs engaging primary pipe 14. Outer portion 44 of interior fitting 40 is positioned adjacent to and abutting seal 50. Since interior fitting 40 is an annular, integral piece extending 360 degrees and seal 50 is an annular seal extending 360 degrees, seal 50 extends circumferentially and in contact with outer portion 44 of interior fitting 40 along entire circumference of double-walled conduit 10. In this way, there is a continuous seal between interior fitting 40 and secondary pipe 15 of double-walled conduit 10. While in the configuration of FIG. 5A, seal 50 has not been activated, however the relative positioning of interior fitting 40 and seal 50 defines a gap, illustratively an annular channel 56, that extends entirely around double-walled conduit 10 and is positioned between seal 50, outer wall 46 of interior fitting 40, inner wall 48 of interior fitting 40 and corner wall 59 of interior fitting 40. Corner wall 59 is defined as the intersection between outer wall 46 and inner wall 48. Specifically, annular channel 56 is defined between outer wall 46 and inner wall 48 in a direction generally transverse to longitudinal axis L and defined between seal 50 and corner wall 59 of interior fitting 40 in a direction along longitudinal axis L. In other words, seal 50 is compressed against outer wall 46 of interior fitting 40 at a junction, and annular channel 56 terminates at the junction.

As illustrated in FIG. 5A, first exterior fitting portion 34 is positioned on a first side of double-walled conduit 10 and second exterior fitting portion 36 is positioned on a second side of double-walled conduit 10, the second side being opposite of the first side. First and second exterior fitting portions 34, 36 are each slightly spaced from double-walled conduit 10 in the radial direction. As such, in the configuration of FIG. 5A, first and second exterior fitting portions 34, 36 are not yet positioned in contact with double-walled conduit 10 and interior fitting 40.

Figure 5B:
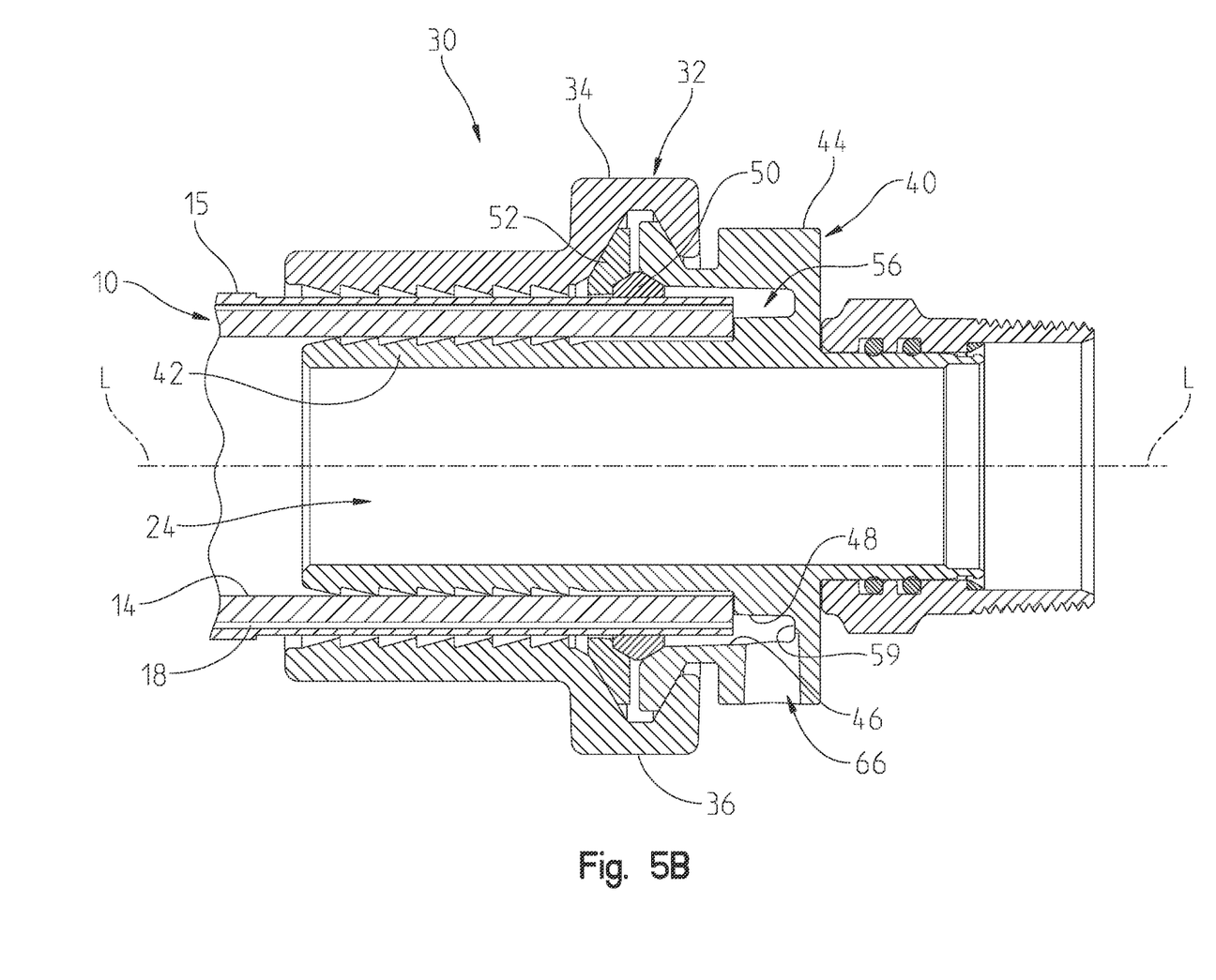

FIG. 5B illustrates termination fitting assembly 30 when first exterior fitting portion 34 and second exterior fitting portion 36 are positioned closer to double-walled conduit 10 than as shown in FIG. 5A in the radial direction, such that first exterior fitting portion 34 and second exterior fitting portion 36 begin engagement with outer portion 44 of interior fitting 40 and with compression ring 52. Additionally, at least a portion of first exterior fitting portion 34 and second exterior fitting portion 36 is barbed, such that upon coupling of exterior fitting 32 and double-walled conduit 10, at least a portion of each first exterior fitting portion 34 and second exterior fitting portion 36 engages with an outer surface of double-walled conduit 10. In other words, barbs of the barbed portions engage into the outer surface of secondary pipe 15. Continued radial compression of first and second exterior fitting portions 34, 36 begins to cause activation of seal 50 to sealingly engage interior fitting 40 and secondary pipe 15 of double-walled conduit 10, as is disclosed further with reference to FIG. 5C.

Figure 5C:
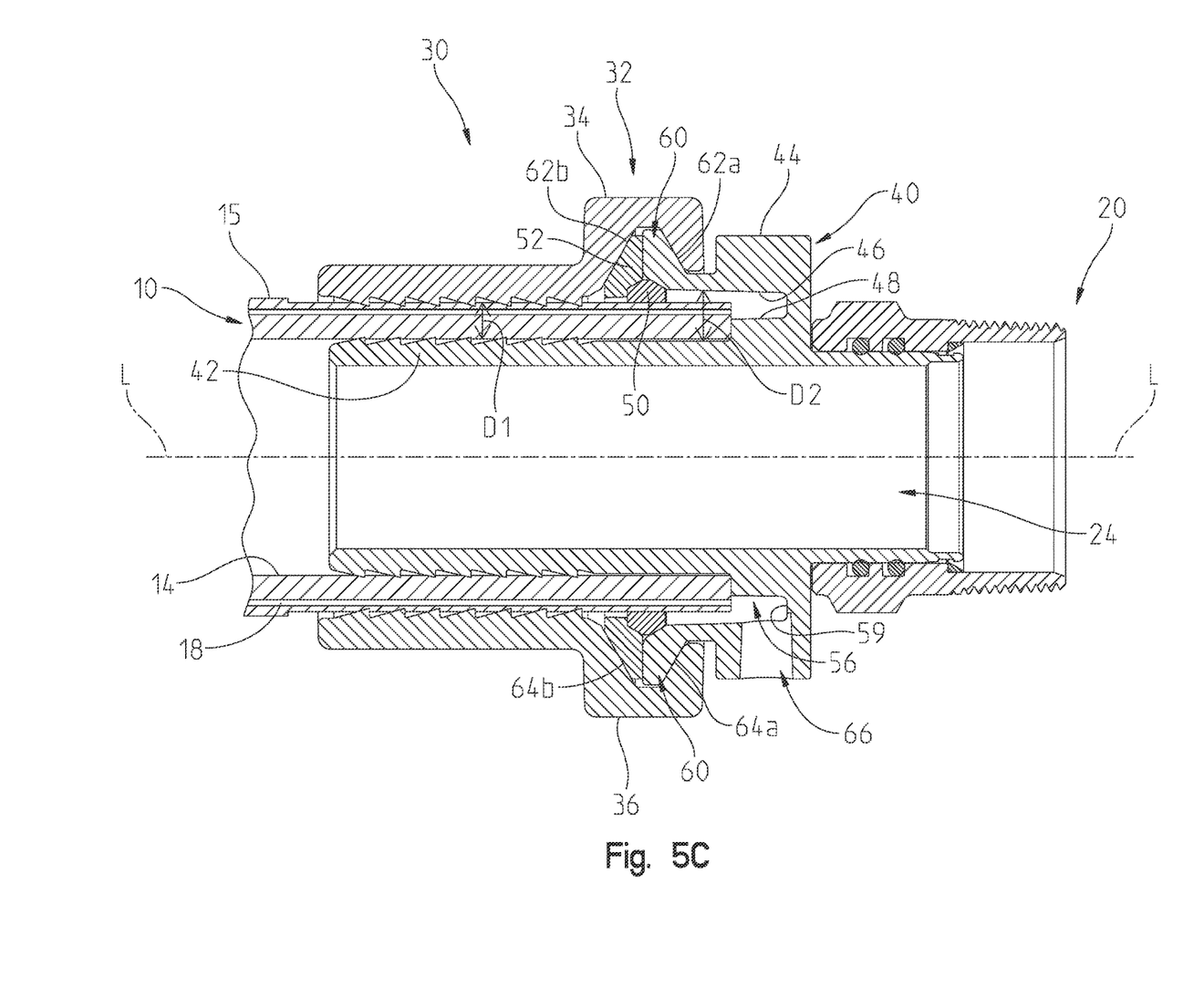

FIG. 5C illustrates termination fitting assembly 30 after continued compression of exterior fitting 32 onto double-walled conduit 10 in the radial direction and coupling of first and second exterior fitting portions 34, 36. Secure coupling between first and second exterior fitting portions 34, 36 may be defined as when the at least two openings 39 of each first and second exterior portions 34, 36 have received the at least two coupling bolts 38 (FIG. 3) and the coupling bolts 38 have been secured, for example, with nuts. In other embodiments, one of first and second exterior portions 34, 36 is threaded such that nuts or other securement methods are not used with coupling bolts 38. As illustrated in FIG. 5C, once first exterior fitting portion 34 and second exterior fitting portion 36 are securely coupled, first exterior fitting portion 34 and second exterior fitting portion 36 engage with, or are positioned against, compression ring 52 and interior fitting 40, and exert a compressive force onto compression ring 52 and interior fitting 40 which is then transferred to seal 50, as will be described further herein. Engagement of first exterior fitting portion 34 and second exterior fitting portion 36 with compression ring 52 and interior fitting 40 activates seal 50 to be sealingly engaged with double-walled conduit 10 and interior fitting 40. Specifically, outer portion 44 of interior fitting portion 40 comprises a ramped portion 60 that extends around secondary pipe 15 through 360 degrees. As first exterior fitting portion 34 and second exterior fitting portion 36 are advanced towards double-walled conduit and into engagement, a ramped surface 62a of first exterior fitting portion 34 and a ramped surface 64a of second exterior fitting portion 36 contact and abut the ramped portion 60 of interior fitting 40. A second ramped surface 62b of first exterior fitting portion 34 and a second ramped surface 64b of second exterior fitting portion 36 contact and abut compression ring 52. In this way, as the first exterior fitting portion 34 and second exterior fitting portion 36 are brought into engagement around double-walled conduit 10 such that first exterior fitting portion 34 and second exterior fitting portion 36 can be securely coupled, first ramped surfaces 62a, 64a and second ramped surfaces 62b, 64b impart a compressive force onto compression ring 52 and interior fitting 40 that exerts both an axial and radial force vector component that is transferred onto seal 50, such that the compressive force is exerted onto seal 50. The axial component of the compressive forces may translate the interior fitting axially towards seal 50 and the compressing ring axially towards seal 50 to ensure that interior fitting portion 40 is in sealed contact with seal 50. In this way, during assembly of termination fitting assembly 30, compression ring 52, seal 50, and outer portion 44 of interior fitting 40 do not need to be positioned in the precise positioning that is desired for end use. Securing of first exterior fitting portion 34 and second exterior fitting portion 36 will cause any necessary axial displacement of seal 50, compression ring 52 and outer portion 44 that is necessary for proper positioning and alignment. Additionally, as the compressive force is exerted onto seal 50, the radial component causes radial expansion of seal 50 such that it becomes securely and sealingly engaged with secondary pipe 15 and interior fitting 40. As a result, once first exterior fitting portion 34 and second exterior fitting portion 36 are securely coupled as illustrated in FIG. 5C, seal 50 and interior fitting 40 comprise a sealed engagement therebetween that extends 360 degrees about the longitudinal axis L of double-walled conduit 10.

With continued reference to FIG. 5C, the inner diameter of primary pipe 14 is spaced from an outer diameter of secondary pipe 15 by a first distance D1. Inner wall 48 of interior fitting 40 is spaced from outer wall 46 of interior fitting 40 by a second distance D2. Second distance D2 is larger than first distance D1. Each of first distance D1 and second distance D2 extend along a direction perpendicular to longitudinal axis L. This configuration may be beneficial for providing flexibility in the positioning of seal 50 for defining annular channel 56. In other words, the configuration of first distance D1 and second distance D2 creates a gap between secondary pipe 15 and outer wall 46 of interior fitting 40 that extends a distance along (i.e., nominally coincidental to or parallel with) longitudinal axis L. As such, seal 50 may be positioned around secondary pipe 15 at any position along this gap for effecting sealing between interior fitting 40 and secondary pipe 15. It is thus not imperative for seal 50 to be positioned at the end of secondary pipe 15 to maintain a sealed boundary of annular channel 56, which may otherwise be required if the gap was not present. Further, while double-walled conduit 10 is illustrated terminating at a ridge of interior portion 40 as shown in FIGS. 5A-5C, because such indexing of interior fitting 40 to double-walled conduit 10 is not required to effect proper sealing, as described herein.

As previously described with reference to FIG. 5A, once interior fitting 40 is engaged with seal 50 and double-walled conduit 10, outer wall 46 and inner wall 48 define annular channel 56 positioned therebetween and annular channel 56 is sealed within outer wall 46 and inner wall 48. In this way, annular channel 56 extends between outer wall 46 and inner wall 48 in a direction transverse to longitudinal axis L and extends between a corner wall 59 of interior fitting 40 and seal 50 in a direction along (i.e., nominally coincidental with or parallel to) longitudinal axis L. Additionally, since annular channel 56 is not defined by exterior fitting 32, additional seals, such as additional O-rings, between exterior fitting 32 and double-walled conduit 10 are not be required. Since interior fitting 40 and annular seal 50 are annular and integral pieces, annular channel 56 extends entirely and continuously around double-walled conduit 10 circumferentially. The above configurations of annular channel 56 may simplify both the manufacture of termination fitting assembly 30 and the number of components required for termination fitting assembly 30.

Additionally, as a result of this configuration and as illustrated in FIGS. 5A-5C, annular channel 56 is in fluid communication with interstitial space 18. As such, monitoring devices and/or assemblies may be used in combination with double-walled conduit 10 and termination fitting assembly 30 for determining if there is fluid, gas, undesired pressure changes, or any other activity occurring within interstitial space 18 of double-walled conduit 10. For example, port 66 is used for connecting termination fitting assembly 30 (and interstitial space 18) with a testing or monitoring device/assembly for testing for leaks or pressure changes, as previously described. Testing or monitoring devices may be secured with the wall defining port 66 to create fluid communication between annular channel 56 and the devices. In some embodiments, the testing may be continuous testing of interstitial space 18 through annular channel 56, for example as disclosed in U.S. Pat. No. 7,051,579 titled "Method and apparatus for continuously monitoring interstitial regions in gasoline storage facilities and pipelines," issued on May 30, 2006, the entire disclosure of which is hereby explicitly incorporated herein by reference. In other embodiments, testing and monitoring assemblies may be used to sporadically test interstitial space 18 through annular channel 56 for leaks or pressure changes. An operator may then be able to determine when there is a leak or malfunction in double-walled conduit 10 that signifies malfunction in the system and intervene to correct the problem, thus minimizing potential contamination of the surround environment and/or any unwanted loss of the fluids or gas being held within double-walled conduit 10.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A conduit system comprising:
a conduit comprising a primary pipe positioned centrally within a secondary pipe along a longitudinal axis of the conduit, the conduit having an interstitial space defined between the primary pipe and secondary pipe; and
a termination fitting assembly comprising:
an interior fitting formed as a one-piece, monolithic structure having an inner wall and an outer wall, the inner wall sized and shaped for insertion into and sealing with the primary pipe, and the outer wall extending circumferentially around the secondary pipe of the conduit,
an annular channel defined between the inner wall and the outer wall of the interior fitting and in fluid communication with the interstitial space of the conduit; and
an exterior fitting positioned around the conduit;
wherein the termination fitting assembly further comprises a compression ring and an annular seal positioned about the secondary pipe; and
wherein the exterior fitting comprises at least two exterior fitting portions configured for reversable coupling about the conduit.

2. The conduit system of claim 1, wherein the exterior fitting exerts a compressive force onto the annular seal when the two exterior fitting portions are securely coupled.

3. The conduit system of claim 2, wherein when the compressive force is exerted onto the annular seal, the annular seal is sealingly engaged with the conduit and the interior fitting.

4. The conduit system of claim 1, wherein the annular channel extends circumferentially and continuously around the conduit.

5. The conduit system of claim 1, wherein the primary pipe comprises an inner diameter and the secondary pipe comprises an outer diameter, and wherein the outer wall of the interior fitting is spaced from the inner wall of the interior fitting by a distance that is larger than a distance between an inner diameter of the primary pipe and an outer diameter of the secondary pipe.

6. The conduit system of claim 1, wherein the annular seal is compressed against the outer wall of the interior fitting at a junction and the annular channel terminates at the junction.

7. A conduit system comprising:
a conduit defined by a primary pipe positioned within a secondary pipe and the conduit having an interstitial space defined between the primary pipe and secondary pipe, the primary pipe having an inner diameter and the secondary pipe having an outer diameter;
a termination fitting assembly comprising:
an interior fitting positioned at least partially within the primary pipe, the interior fitting having an inner wall and an outer wall defining a gap between the inner wall and the outer wall, and a corner wall forming an intersection between the inner wall and the outer wall;
an exterior fitting extending about the secondary pipe, and
wherein a distance between the inner diameter of the primary pipe and the outer diameter of the secondary pipe is less than a distance between the inner wall and the outer wall.

8. The system comprising of claim 7, wherein the interior fitting is an integral and continuous element such that a channel defined between the inner wall and the outer wall is a continuous and annular.

9. The system comprising of claim 8, wherein the channel between the inner wall and the outer wall of the interior fitting is in fluid communication with the interstitial space of the conduit.

10. The system comprising of claim 7, further comprising an annular seal and a compression ring, the annular seal sealingly engageable with the conduit and the interior fitting.

11. The system comprising of claim 10, wherein the exterior fitting is composed of two exterior fitting portions that are reversibly coupled and clamped around the conduit.

12. The system comprising of claim 11, wherein when the exterior fitting is clamped circumferentially around the conduit, the first and second exterior portions exert a compressive force onto the annular seal.

13. The system comprising of claim 12, wherein the compressive force activates the annular seal, such that the annular seal is sealingly engaged with the conduit and the interior fitting.

14. A method of testing an interstitial space of a double-walled conduit, the interstitial space defined as the space between a primary pipe and a secondary pipe of the double-walled conduit, the double-walled conduit defining a longitudinal passageway, the method comprising:
positioning a compression ring circumferentially around the double-walled conduit;
positioning a seal circumferentially around the double-walled conduit and directly adjacent the compression ring;
inserting an interior fitting at least partially into the longitudinal passageway of the double-walled conduit; and
securing an exterior fitting circumferentially around double-walled conduit, such that a portion of the exterior fitting engages with at least a portion of the interior fitting and urges the compression ring to axially displace toward the seal, such that the seal creates sealed engagement between the interior fitting and the conduit;
wherein the exterior fitting is composed of a first and second exterior fitting, and securing the exterior fitting comprises:
positioning the first exterior fitting on a first side of the double-walled conduit,
positioning the second exterior fitting on a second side of the double-walled conduit,
engaging the first and second exterior fitting portions through compressing the portions against the double-walled conduit until openings of the first and second exterior fitting portions abut one another; and securing the first and second exterior portions together with at least one bolt.

15. The method of claim 14, wherein an annular channel extends between an inner wall and an outer wall of the interior fitting.

16. The method of claim 14, wherein securing the exterior fitting circumferentially comprises a radial movement of the exterior fitting which causes the axial displacement of the compression ring and activates the seal to be sealingly engaged with the interior fitting and the double-walled conduit.

17. The method of claim 15, wherein the annular channel is positioned for fluid communication with the interstitial space.

18. A method of testing an interstitial space of a double-walled conduit, the interstitial space defined as the space between a primary pipe and a secondary pipe of the double-walled conduit, the double-walled conduit defining a longitudinal passageway, the method comprising:

positioning a compression ring circumferentially around the double-walled conduit;

positioning a seal circumferentially around the double-walled conduit and directly adjacent the compression ring;

inserting an interior fitting at least partially into the longitudinal passageway of the double-walled conduit; and securing an exterior fitting circumferentially around double-walled conduit, such that a portion of the exterior fitting engages with at least a portion of the interior fitting and urges the compression ring to axially displace toward the seal, such that the seal creates sealed engagement between the interior fitting and the conduit;

wherein an annular channel extends between an inner wall and an outer wall of the interior fitting;

wherein the annular channel is positioned for fluid communication with the interstitial space; and wherein the method further comprises monitoring the annular channel for detecting fluid, gas, and pressure levels in the interstitial space.

19. The termination fitting assembly of claim 7, wherein the inner wall, the outer wall and the corner wall are formed as part of a one-piece, monolithic structure.

20. A termination fitting assembly for use with a conduit, the conduit comprising a primary pipe positioned centrally within a secondary pipe along a longitudinal axis of the conduit, the conduit having an interstitial space defined between the primary pipe and secondary pipe, the termination fitting assembly comprising:

an interior fitting having an inner wall and an outer wall, the inner wall sized and shaped for insertion into and sealing with the primary pipe, and the outer wall extending circumferentially around the secondary pipe of the conduit, an annular channel defined between the inner wall and the outer wall of the interior fitting and in fluid communication with the interstitial space of the conduit;

an exterior fitting positioned around the conduit; and a compression ring and an annular seal positioned about the secondary pipe, the annular seal is compressed against the outer wall of the interior fitting at a junction and the annular channel terminates at the junction.

* * * * *